US007832281B2

(12) United States Patent
Mian et al.

(10) Patent No.: US 7,832,281 B2
(45) Date of Patent: Nov. 16, 2010

(54) MEMS-BASED MONITORING

(75) Inventors: Zahid F. Mian, Loudonville, NY (US); Ryk E. Spoor, Troy, NY (US)

(73) Assignee: International Electronic Machines Corporation, Troy, NY (US)

( * ) Notice: Subject to any disclaimer, the term of this patent is extended or adjusted under 35 U.S.C. 154(b) by 0 days.

(21) Appl. No.: 12/171,313

(22) Filed: Jul. 11, 2008

(65) Prior Publication Data

US 2009/0000387 A1 Jan. 1, 2009

Related U.S. Application Data

(63) Continuation of application No. 11/532,212, filed on Sep. 15, 2006, now Pat. No. 7,412,899.

(60) Provisional application No. 60/717,266, filed on Sep. 16, 2005.

(51) Int. Cl.
*G01M 10/00* (2006.01)
*G01H 1/00* (2006.01)

(52) U.S. Cl. ............................ 73/802; 73/763; 73/773; 73/579; 73/583; 340/870.18; 702/42; 702/56

(58) Field of Classification Search .................. 73/579, 73/583, 763, 769, 773, 802; 340/870.25, 340/870.26, 870.18; 365/174; 702/42, 56
See application file for complete search history.

(56) References Cited

U.S. PATENT DOCUMENTS

| | | | |
|---|---|---|---|
| 4,524,620 | A | 6/1985 | Wright et al. |
| 5,216,631 | A | 6/1993 | Sliwa, Jr. |
| 5,307,311 | A | 4/1994 | Sliwa, Jr. |
| 5,970,393 | A | 10/1999 | Khorrami et al. |
| 6,014,896 | A | 1/2000 | Schoess |
| 6,076,405 | A | 6/2000 | Schoess |
| 6,192,759 | B1 | 2/2001 | Schoess |
| 6,278,379 | B1 | 8/2001 | Allen et al. |
| 6,319,208 | B1 | 11/2001 | Abita et al. |

(Continued)

OTHER PUBLICATIONS

G. Asada et al. "Low Power Wireless Communication and Signal Processing Circuits for Distributed Microsensors." 1997 IEEE International Symposium on Circuits and Systems, Jun. 9-12, 1997.*

(Continued)

*Primary Examiner*—Lisa M Caputo
*Assistant Examiner*—Punam Roy
(74) *Attorney, Agent, or Firm*—John W. LaBatt; Hoffman Warnick LLC

(57) ABSTRACT

A solution for monitoring a property of an object and/or an area using a Micro-ElectroMechanical Systems (MEMS)-based monitoring device is provided. In an embodiment of the invention, the MEMS-based monitoring device includes a MEMS-based sensing device for obtaining data based on a property of the object and/or area and a power generation device that generates power from an ambient condition of the monitoring device. In this manner, the monitoring device can operate independent of any outside power sources or other devices. Further, the monitoring device can include a transmitter that transmits a signal based on the property. The monitoring device can be used to monitor a moving component of a machine, and can be integrated with a health monitoring system of the machine using one or more relay devices.

10 Claims, 13 Drawing Sheets

U.S. PATENT DOCUMENTS

| | | | | |
|---|---|---|---|---|
| 6,321,602 | B1 | 11/2001 | Ben-Romdhane | |
| 6,392,584 | B1 | 5/2002 | Eklund | |
| 6,693,548 | B2 | 2/2004 | Boyce et al. | |
| 6,799,126 | B1 | 9/2004 | Ratcliffe et al. | |
| 2003/0006668 | A1 | 1/2003 | Lal et al. | |
| 2004/0008651 | A1 | 1/2004 | Ahmed | |
| 2005/0262943 | A1 * | 12/2005 | Claydon et al. | ............... 73/579 |
| 2006/0080048 | A1 | 4/2006 | Kessler et al. | |
| 2006/0170535 | A1 | 8/2006 | Watters et al. | |
| 2006/0267167 | A1 | 11/2006 | McCain | |
| 2007/0285248 | A1 | 12/2007 | Hamel et al. | |

OTHER PUBLICATIONS

U.S. Appl. No. 11/532,212, “Notice of Allowance”, Jul. 1, 2008, 24 pages.

U.S. Appl. No. 11/532,212, “Petition to Withdrawal”, May 15, 2008, 1 page.

U.S. Appl. No. 11/532,212, “Commentson Statement of Reason for Allowance”, Apr. 29, 2008, 1 page.

U.S. Appl. No. 11/532,212, “Notice of Allowance”, Jan. 29, 2008, 19 pages.

U.S. Appl. No. 11/532,212, Amendment to Final Office Action, Dec. 18, 2007, 11 pages.

U.S. Appl. No. 11/532,212, “Final Office Action”, Nov. 6, 2007, 10 pages.

U.S. Appl. No. 11/532,212, “Amendment to Office Action”, Jul. 12, 2007, 12 pages.

U.S. Appl. No. 11/532,212, “Office Action”, Apr. 12, 2007, 12 pages.

C.-Y. Lee, G.-B. Lee. “MEMS-Based Humidity Sensors with Integrated Temperature Sensors for Signal Drift Compensation” Sensors, 2003. Proceedings of IEEE. pp. 384-388. Accessed online on Oct. 30, 2007. <http://ieeexplore.ieee.org/>.

Y.B. Jeon, R. Sood, J.-h. Jeong, S.-G. Kim “MEMS power generator with transverse mode thin film PZT” Sensors and Actuators A. 122. 2005. pp. 16-22. Accessed online on Oct. 30, 2007. <www.sciencedirect.com>.

E. Vittoz. “Future of analog in the VLSI environment.” Circuits and Systems, 1990. IEEE International Symposium. vol. 2. pp. 1372-1375. Accessed online on Oct. 30, 2007. <http://ieeexplore.ieee.org/>.

S. Roundy, P.K. Wright, J. Rabaey. “A study of low level vibrations as a power source for wireless sensor nodes” Computer Communications 26. 2003. pp. 1131-1144. Accessed online on Oct. 30, 2007. <www.elsevier.com>.

Warneke and Pister, “MEMS for Distributed Wireless Sensor Networks,” 9th Int’l Conf on Electronics, Circuits and Systems, Dubrovnik, Croatia, Sep. 15-18, 2002, 27 pages.

Clark T.-C. Nguyen, Transceiver Front-End Architectures Using Vibrating Micromechanical Signal Processors. Digest of Papers, Topical Meeting on Silicon Monolithic Integrated Circuits in RF Systems, Sep. 2001, pp. 23-32.

Imed Zine-El-Abidine, Michal Okoniewski and John G. McRory: A New Class of Tunable RF MEMS Inductors, Proceedings of the International Conference on MEMS, NANO and Smart Systems (ICMENS 2003), pp. 1-2.

Rijks, Vanbeek, Steeneken et. al., MEMS Tunable Capacitors and Switches for RF Applications, Proceedings of the 24th International Conference on Microelectronics, vol. 1, pp. 49-56, May 2004.

E.P. James, M.J. Tudor, S.P. Beeby, N.R. Harris, P. Glynne-Jones, J.N. Ross, N.M. White “An Investigation of Self-Powered Systems for Condition Monitoring Applications” Sensors and Actuators a 110 2004 pp. 171-176. Accessed online on Oct. 30, 2007. <www.elsevier.com>.

Mitcheson et. al., MEMS electrostatic micropower generator for low frequency operation, Sensors and Actuators A, 115, pp. 523-529, 2004.

Kenneth C. Bradley, Mechanical Computing in Microelectromechanical Systems (MEMS), Thesis, Graduate School of Engineering and Management of the Air Force Institute of Technology Air University, Mar. 25, 2003, 172 pages.

* cited by examiner

MEMS-BASED MONITORING

REFERENCE TO RELATED APPLICATIONS

The current application is a continuation of U.S. Utility patent application Ser. No. 11/532,212, filed on 15 Sep. 2006 now U.S. Pat. No. 7,412,899, which claims the benefit of U.S. Provisional Application No. 60/717,266, filed on 16 Sep. 2005, both of which are hereby incorporated herein by reference.

GOVERNMENT LICENSE RIGHTS

The U.S. Government has a paid-up license in this invention and the right in limited circumstances to require the patent owner to license others on reasonable terms as provided for by the terms of Contract Numbers N68335-06-C-0216 and N68335-06-C-0217 awarded by the Naval Air Systems Command of the U.S. Navy.

FIELD OF THE INVENTION

Aspects of the invention relate generally to monitoring physical parameters, and more particularly, to a solution for monitoring properties of a component and/or an area.

BACKGROUND OF THE INVENTION

Complex machinery, such as vehicles (e.g., an automobile, plane, rotorcraft, locomotive, etc.), generators, automated machining tools, etc., include numerous constituent components (e.g., levers, arms, pistons, driveshafts, clutch plates, etc.) that move and are subject to stress and strain during their operating lifetime. Such repeated stress/strain eventually causes a component to fail. To avoid failure during operation of the machinery, numerous approaches can be used.

For example, the component can be manufactured to a sufficient robustness that the stress/strain to which it will be subjected during operation will not cause it to fail in any reasonable time period. However, this approach frequently requires a massive over design of the component, thereby adding mass and size to the component, which reduces the operating efficiency of the machine. As a result, use of this approach is often limited to applications in which the component is extremely expensive to replace, the component absolutely cannot fail, and there is sufficient space and weight available in the machine to accommodate the over designed component.

In other approaches, the component is replaced prior to failure. For example, the component can be replaced at an interval shorter than any possible failure. Typically, this approach is limited to components that are relatively inexpensive to replace. Alternatively, the component can be replaced on a schedule that is determined based on statistical wear and usage. In particular, a history of the machine and the component are examined over many lifetimes to produce a recommended schedule of replacement. However, this approach is limited to machines having a sufficiently long operating history. Additionally, since the approach is statistical, unexpected failure is possible. As a result, a worst-case scenario may be assumed in practical applications, which can result in a component being disposed long before its useful lifetime would have ended. In another approach, one or more models can be used to simulate operational characteristics of the machine and/or component to produce a lifetime use formula. However, since this approach is also statistical, large safety margins are frequently used, which can result in a component being disposed long before its useful lifetime would have ended.

Ideally, a component could be directly monitored and replaced when a selected percentage of its useful lifetime has expired. However, to date, many components have not been effectively instrumented for monitoring due to size constraints and/or operating conditions (e.g., extreme heat, cold, vibration, and/or the like). Additionally, the monitoring instruments frequently require wiring for communication and/or power, which often cannot be included in moving components. However, directly monitoring component(s) remains a desirable goal. For example, such a solution could reduce the time, effort, and material wasted in performing periodic inspections and replacing components that have not reached their useful lifetimes, without compromising the operational functionality or safety of the machine.

Similarly, it is desirable to monitor a "limiting" component of a machine. The limiting component is a component whose operational parameters limits the use of one or more additional components, and therefore limits the performance of the machine. In particular, a maximum amount of stress/strain that a component can withstand may be limited due to space/weight/material constraints of the component. However, a model of the machine may indicate that other component(s) may be able to operate in a manner that would generate an amount of stress/strain on the component that exceeds the maximum amount. In this case, since the actual stress/strain cannot be measured, operation of the other component(s) will be limited to keep the stress/strain induced on the component within safe limits based on the model (and some safety margin).

Electronic and mechanical designs for devices continue to be reduced in size. In recent years, micro-scale engineering has proposed theoretical and experimental designs for these devices, often referred to as Micro-ElectroMechanical Systems (MEMS) and Nano-ElectroMechanical Systems (NEMS). As a result of these designs, some practical applications have begun to emerge on the market in the form of miniature sensors for some limited domains. Approaches for building MEMS devices exist for many challenges currently met by microelectronic devices. For example, microscale steam engines, shutters, mirrors, power systems, and others have been produced, while designs for MEMS solar cells and light-based communications, radio frequency (RF)-related MEMS devices, MEMS power harvesting/generation sources, MEMS memory devices, and others, also have been proposed.

In view of the foregoing, a need exists to overcome one or more of the deficiencies in the related art.

BRIEF SUMMARY OF THE INVENTION

Aspects of the invention provide a solution for monitoring a property of an object and/or an area using a Micro-Electro-Mechanical Systems (MEMS)-based monitoring device. In an embodiment of the invention, the MEMS-based monitoring device includes a MEMS-based sensing device for obtaining data based on a property of the object and/or area and a power generation device that generates power from an ambient condition of the monitoring device. In this manner, the monitoring device can operate independent of any outside power sources or other devices. Further, the monitoring device can include a transmitter that transmits a signal based on the property. The monitoring device can be used to monitor a moving component of a machine, and can be integrated with a health monitoring system of the machine using one or more relay devices.

A first aspect of the invention provides a system for monitoring a property of an object, the system comprising: a monitoring device physically associated with the object, the monitoring device including: a Micro-ElectroMechanical Systems (MEMS)-based sensing device; a transmitter that transmits a signal based on the property; and a power generation device that generates power from an ambient condition of the monitoring device.

A second aspect of the invention provides a monitoring system comprising: a monitoring device including: a Micro-ElectroMechanical Systems (MEMS)-based sensing device for obtaining data based on a property of at least one of: an object or an area; a power generation device that generates power from an ambient condition of the monitoring device.

A third aspect of the invention provides a machine comprising: a plurality of components; and at least one monitoring device physically associated with at least one of the plurality of components, the at least one monitoring device including: a Micro-ElectroMechanical Systems (MEMS)-based sensing device having at least one attribute that changes with a property of the at least one of the plurality of components; a transmitter that transmits a signal based on the property; and a power generation device that generates power from an ambient condition of the monitoring device.

A fourth aspect of the invention provides methods for monitoring a property of an object or an area using the systems described herein.

A fifth aspect of the invention provides a method of generating one or more of the systems described herein.

A sixth aspect of the invention provides a business method for monitoring a property of an object or an area, the business method comprising managing a computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for monitoring a property of an object and/or an area using a Micro-ElectroMechanical Systems (MEMS)-based monitoring device. In an embodiment of the invention, the MEMS-based monitoring device includes a MEMS-based sensing device for obtaining data based on a property of the object and/or area and a power generation device that generates power from an ambient condition of the monitoring device. In this manner, the monitoring device can operate independent of any outside power sources or other devices. Further, the monitoring device can include a transmitter that transmits a signal based on the property. The monitoring device can be used to monitor a moving component of a machine, and can be integrated with a health monitoring system of the machine using one or more relay devices. As used herein, unless otherwise noted, the term "set" means one or more (i.e., at least one) and the phrase "any solution" means any now known or later developed solution.

For convenience, the remainder of the Detailed Description of the Invention includes the following headers.

I. Illustrative Monitoring Environment
II. RELAY DEVICE
III. MONITORING DEVICE
A. ILLUSTRATIVE MEMS-BASED MONITORING DEVICE
B. ILLUSTRATIVE MEMS-BASED POWER GENERATION DESIGN
C. ILLUSTRATIVE MEMS-BASED STRAIN SENSING DESIGNS
D. MEMS MANUFACTURING
E. ALTERNATIVES
IV. ILLUSTRATIVE APPLICATIONS
V. ALTERNATIVES

I. Illustrative Monitoring Environment

Figure 1:
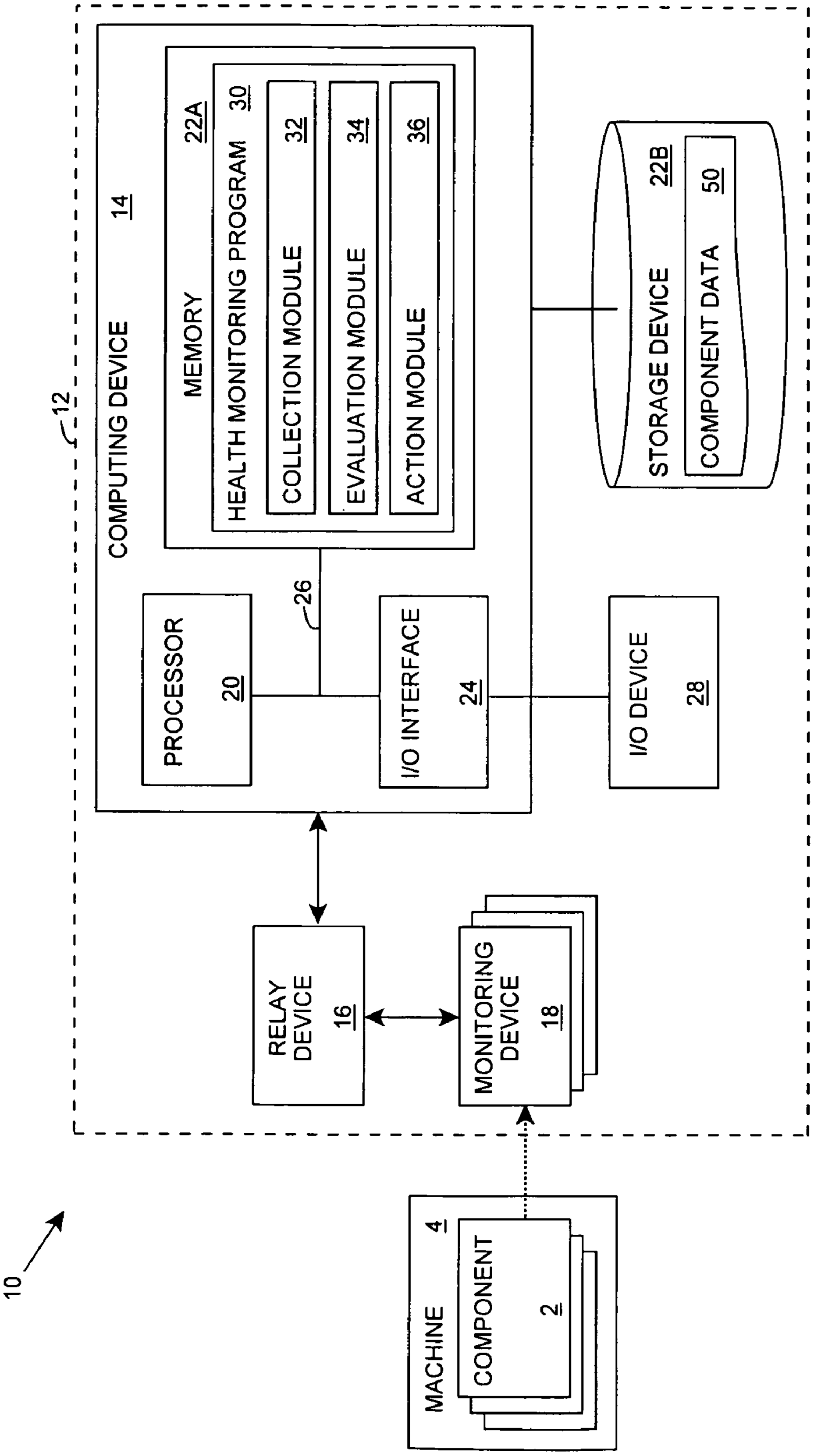
FIG. 1 shows an illustrative environment for monitoring a set of properties for a set of components of a machine according to an embodiment of the invention.

Turning to the drawings, FIG. 1 shows an illustrative environment 10 for monitoring a set of properties for a set of components 2 of a machine 4 according to an embodiment of the invention. Machine 4 can comprise any type of mechanical apparatus for performing any type of work. To this extent, machine 4 can comprise a complete apparatus (e.g., an automobile) or machine 4 also can comprise a component of a still larger mechanical apparatus (e.g., an automobile engine, an enclosure, mechanical linkage, and/or the like). Each component 2 can comprise any type of part that performs some function. During operation of machine 4, component 2 may be in motion or stationary in relation to one or more other components of machine 4. To this extent, the interrelation of the functions performed by a plurality of components 2 can result in the work performed by machine 4. However, it is understood that component 2 can provide an ancillary function, such as protection, safety, emissions control, monitoring, and/or the like, without which machine 4 may continue to successfully perform the work.

In any event, environment 10 includes a computer system 12 that includes a set of monitoring devices 18, a relay device 16, and a computing device 14 that includes a health monitoring program 30, which collectively can perform the process described herein in order to monitor component(s) 2. In particular, a monitoring device 18 obtains (e.g., senses) a property of a component 2, a relay device 16 collects and/or processes the property(ies) from one or more monitoring devices 18, and health monitoring program 30 makes computing device 14 a health monitoring system, which is operable to manage component data 50 and/or perform one or more actions based on the property(ies).

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as health monitoring program 30, which is stored in a storage system, such as memory 22A and/or storage device 22B. While executing program code, processor 20 can read and/or write data, such as component data 50, to/from memory 22A, storage device 22B, and/or I/O interface 24. Bus 26 provides a communications link between each of the components in computing device 14. I/O device 28 can comprise any device that transfers information between a user and computing device 14. To this extent, I/O device 28 can comprise an I/O device to enable an individual (human) user to interact with computing device 14 and/or a communications device to enable a system user, such as relay device 16, to communicate with computing device 14 using any type of communications link.

In any event, computing device 14 can comprise any general purpose computing article of manufacture capable of executing program code installed thereon. However, it is understood that computing device 14 and health monitoring program 30 are only representative of various possible equivalent computing devices that may perform the process described herein. To this extent, in other embodiments, the functionality provided by computing device 14 and health monitoring program 30 can be implemented by a computing article of manufacture that includes any combination of general and/or specific purpose hardware and/or program code. In each embodiment, the program code and hardware can be created using standard programming and engineering techniques, respectively. In an embodiment of the invention, relay device 16 and/or monitoring device 18 also comprise a computing device configured similarly to any of the alternatives described herein with respect to computing device 14.

As shown, computer system 12 comprises three or more types of devices 14, 16, 18 that communicate over any combination of various types of communications links to perform the process described herein. Further, while performing the process described herein, one or more devices 14, 16, 18 in computer system 12 can communicate with one or more other computing devices external to computer system 12 using any type of communications link. In either case, a communications link can comprise any combination of various types of wired and/or wireless links; comprise any combination of one or more types of networks; and/or utilize any combination of various types of transmission techniques and protocols.

In an embodiment of the invention, each monitoring device 18 communicates with relay device 16 using a short range (e.g., less than a few feet) wireless communications link, while relay device 16 can communicate with computing device 14 using a wired communications link. However, computer system 12 is only illustrative of various types of computer systems for implementing aspects of the invention. For example, in one embodiment, computer system 12 can comprise a single device, which is configured to implement some or all of the functionality described herein. Similarly, computer system 12 can comprise two types of devices (e.g., no relay device 16) or more than three types of devices for implementing some or all of the functionality described herein.

Health monitoring program 30 enables computer system 12 to manage component data 50. To this extent, health monitoring program 30 is shown including a collection module 32, an evaluation module 34, and an action module 36. Operation of each of the modules and devices shown in FIG. 1 is discussed further herein. However, it is understood that some of the various modules/devices can be implemented independently, combined, and/or stored in memory of one or more separate computing devices that are included in computer system 12. Further, it is understood that some of the modules, devices, and/or functionality may not be implemented, or additional modules, devices, and/or functionality may be included as part of computer system 12.

Regardless, aspects of the invention provide a solution for obtaining and evaluating component data 50 during operation of machine 4. In an embodiment of the invention, computer system 12 is implemented as part of machine 4. For example, computing device 14 can comprise an onboard computing device that monitors components 2 in machine 4, controls the operation of one or more components 2 in machine 4, and/or the like. Alternatively, some or all of computer system 12 can be implemented apart from machine 4. For example, monitoring device(s) 18 and/or relay device(s) 16 can be attached to/located in machine 4 while relay device(s) 16 and/or computing device 14 can be physically located apart from machine 4.

Collection module 32 obtains component data 50 from relay device(s) 16. Collection module 32 and relay device 16 can communicate using any combination of wired/wireless communications solutions, including but not limited to serial communications, universal serial bus (USB), IEEE 802.11 ("Wi-Fi"), infrared communications, acoustic communications, and/or the like. Similarly, collection module 32 can request component data 50 from a relay device 16 or relay device 16 can automatically provide component data 50 periodically, based on a triggering event (e.g., an abnormal property of component 2), and/or the like.

The component data 50 received from relay device 16 can comprise raw and/or filtered measurement data collected by monitoring device 18 and/or data generated by processing the measurement data (e.g., a component property such as stress, an operating condition indication, and/or the like). Additionally, collection module 32 can obtain component data 50 from one or more additional systems (not shown), which monitor other components 2 of machine 4. For example, collection module 32 can obtain component data 50 from legacy monitoring systems currently implemented in many machines 4.

Regardless, evaluation module 34 can evaluate the component data 50. To this extent, evaluation module 34 can generate additional component data 50, which can be stored and/or used in further evaluation. For example, evaluation module 34 can generate statistical data, correlate component data 50 for multiple components 2, and/or the like. In this manner, evaluation module 34 can determine when one or more problems are present in the operation of a component 2 and/or machine 4, can determine a useful lifetime for operating component 2 (e.g., based on the stress actually experienced by the component 2), and/or the like. Consequently, evaluation module 34 can provide a central analysis of the operational characteristics of machine 4 and determine a just in time maintenance schedule for machine 4 and its various components 2.

Action module 36 can request and/or perform one or more actions based on the evaluation of component data 50. For example, when a component 2 has neared the end of its useful lifetime, action module 36 can notify an external system, a user of machine 4, a maintenance individual, and/or the like, which can result in the component 2 being scheduled for replacement. Further, action module 36 can alter the operation of a relay device 16 and/or component 2. In particular, when a failure condition is detected for a component 2, the operation of one or more other components 2 may be adjusted to enable machine 4 to continue to operate, halted to prevent damaging the component(s) 2, and/or the like. Similarly, action module 36 can change the information provided by a relay device 16, request more/less frequent information, and/or the like.

II. Relay Device

In any event, relay device 16 obtains one or more properties of a set of components 2 from a set of monitoring devices 18. Relay device 16 can store, process and/or forward the properties to management health program 30 for storage and/or processing described herein. In an embodiment of the invention, relay device 16 processes the properties received from component(s) 2 and can forward a result of the processing, with or without the properties, to management health program 30 for additional processing and/or storage.

Figure 2:
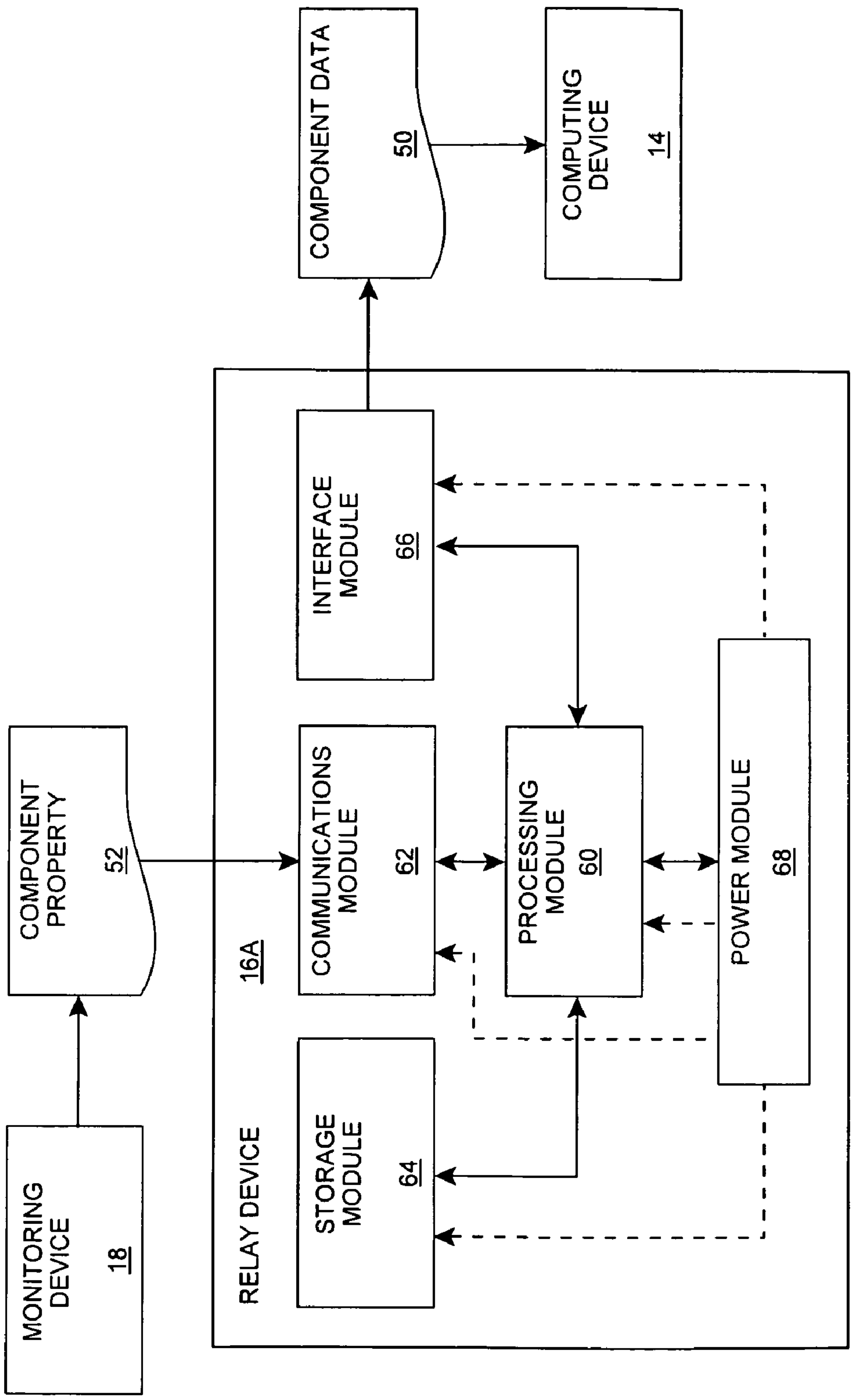
FIG. 2 shows a block diagram of an illustrative relay device according to an embodiment of the invention.

FIG. 2 shows a block diagram of an illustrative relay device 16A according to an embodiment of the invention. In particular, relay device 16A is shown including a processing module 60, which can send/receive data (solid lines) to/from a communications module 62, a storage module 64, an interface module 66, and a power module 68. Power module 68 provides power (dashed lines) to each of the other modules. Each relay device 16A can include Complementary Metal-Oxide Semiconductor (CMOS) and/or Micro-ElectroMechanical Systems (MEMS)-based components to implement the functions described herein. To this extent, each relay device 16A could be manufactured to a size of approximately a centimeter in each dimension. However, it is understood that relay device 16A can comprise any larger or smaller dimension.

In operation, communications module 62 can obtain a set of component properties 52 from one or more monitoring devices 18 using any solution. In an embodiment of the invention, each monitoring device 18 comprises an extremely small, very low power device. In this case, monitoring device 18 and communications module 62 can communicate using a simple, short range, and/or low bandwidth communication protocol. The communication protocol can comprise a unidirectional or bidirectional protocol. To this extent, communications module 62 may comprise only a receiver (for a unidirectional protocol) or a receiver and a transmitter (for a bidirectional protocol). When a bidirectional protocol is used, communications module 62 can request a component property 52 from a particular monitoring device 18, e.g., using a polling approach (e.g., query/response) or the like. Further, communications module 62 can send one or more messages to a monitoring device 18 to adjust its behavior. For example, communications module 62 can turn on/off periodic sending of component properties 52, alter a time period for the periodic sending, and/or the like. Regardless, communications between monitoring device(s) 18 and communications module 62 can use any wireless solution, including but not limited to, radio frequencies, light (coherent or otherwise), acoustics, and/or the like.

Processing module 60 can process component properties 52 that are received by communications module 62 and generate component data 50. To this extent, processing module 60 can use component properties 52 to determine one or more forces (e.g., stress, strain, torque, and/or the like) that are being exerted on the corresponding component 2 (FIG. 1) during operation of machine 4 (FIG. 1), which storage module 64 can store as component data 50. Storage module 64 can include sufficient storage space to temporarily store component properties 52 and/or other component data 50 for a desired period of time, for a cycle of operation, until a triggering signal/event, and/or the like. For example, storage module 64 can store component data 50 until it has been provided to computing device 14 for storage and/or processing by health monitoring program 30 (FIG. 1).

Interface module 66 can support a more complex, longer range, and/or higher bandwidth communications solution for communicating with computing device 14 and/or one or more other relay devices 16A than that implemented in communications module 62. Interface module 66 can communicate with one or more other relay devices 16A to coordinate data gathering from a set of monitoring devices 18, to verify component properties 52, to relay component data 50 from one location to another, and/or the like. Further, interface module 66 can communicate with computing device 14 to provide component data 50 and/or receive one or more operating instructions, which can alter the functionality implemented by relay device 16A (e.g., start/stop polling, adjust polling rate, alter calculations, and/or the like). Interface module 66 can communicate component data 50 for use on computing device 14 using any type of push/pull communications exchange, using a "burst" mode of communications, periodically, and/or the like. In any event, interface module 66 can implement any combination of wired/wireless communications solutions, including but not limited to serial communications, universal serial bus (USB), IEEE 802.11 ("Wi-Fi"), infrared communications, acoustic communications, and/or the like.

Power module 68 can implement any solution for obtaining and providing power for use by the other modules in relay device 16A. To this extent, power module 68 can obtain power from an external power source, such as a power source for one or more components 2 (FIG. 1) of machine 4 (FIG. 1), e.g., a battery for an automobile. Similarly, power module 68 can include an internal power source. In this case, power module 68 can include a power harvesting module, which can generate and/or store power for the operation of relay device 16A. To this extent, the power harvesting module can generate power from solar collection (e.g., for an outdoor application), piezoelectric vibration energy, and/or the like. Regardless, processing module 60 can adjust an amount of power that power module 68 distributes to each of the other modules based on a desired functionality. For example, when not required, power distribution to interface module 66 and/or communications module 62 can be stopped or reduced, thereby conserving the available power for relay device 16A.

Power module 68 can include sufficient capacity for storing power for use by relay device 16A based on the application. In particular, in some embodiments, relay device 16A may only be required to operate in an environment in which power module 68 can harvest (generate) sufficient power to support the operation of relay device 16A. In this case, power module 68 may require little or no power storage capacity. However, in other embodiments, one or more modules in relay device 16A may be required to perform long-term communications and/or processing without an available power source, thereby requiring that power module 68 include a sufficiently large amount of storage capacity.

III. Monitoring Device

Returning to FIG. 1, monitoring device 18 obtains (e.g., senses) a set of properties of a component 2 using any solution. The property(ies) can comprise any relevant physical parameter of component 2 and/or its operating environment. For example, illustrative properties include, but are not limited to, stress, strain, torque, size, thickness, velocity, location, temperature, pressure, humidity/moisture, chemical/biological presence/absence, and/or the like. To this extent, monitoring device 18 can be located adjacent to, connected to, integrated into, affixed to, and/or the like, component 2. Computer system 12 can include a plurality of monitoring devices 18 that collectively monitor multiple components 2 and/or multiple properties of one or more components 2 of machine 4.

Figure 3:
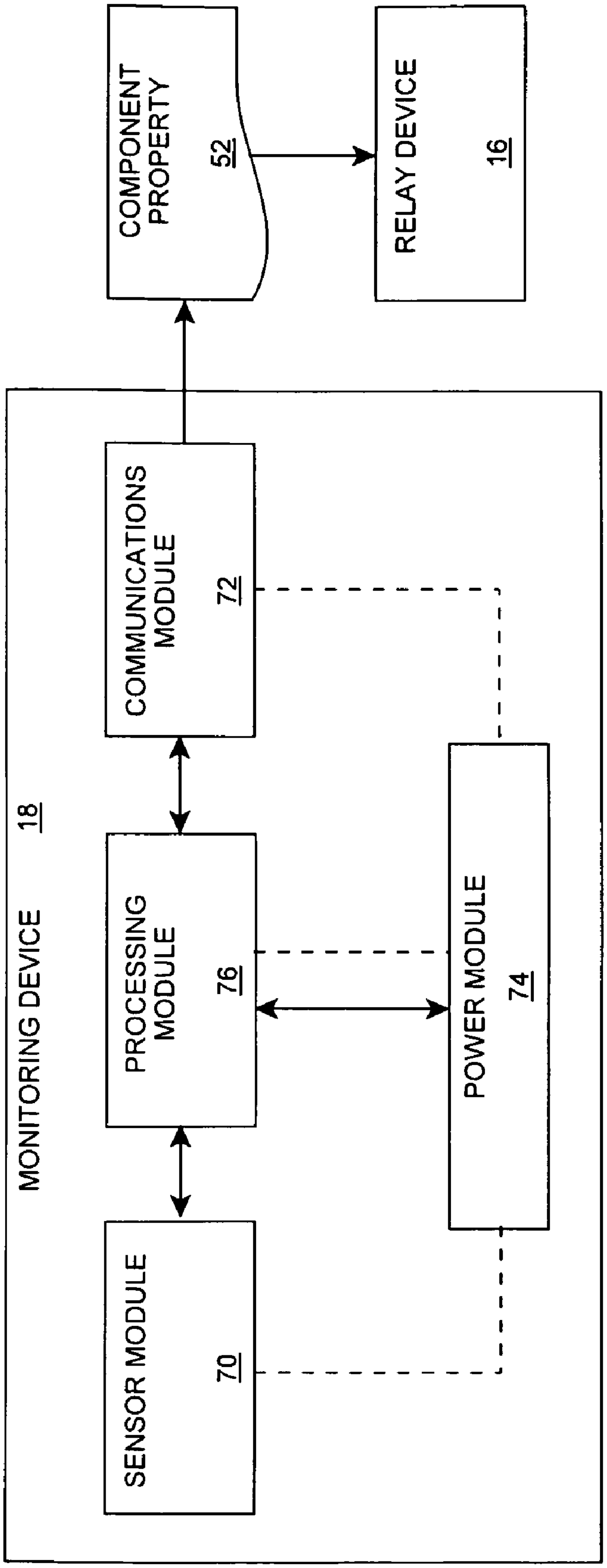
FIG. 3 shows a block diagram of an illustrative monitoring device according to an embodiment of the invention.

In any event, FIG. 3 shows a block diagram of an illustrative monitoring device 18 according to an embodiment of the invention. Monitoring device 18 includes a sensor module 70 that obtains a component property 52, a communications module 72 that communicates the component property 52 to relay device 16, and a power module 74 that provides power (dashed lines) for the other modules in monitoring device 18. Optionally, monitoring device 18 can include a processing module 76 that can receive, store, and/or process the data received by sensor module 70 to generate component property 52 and/or additional data for communication by communications module 72. Each module in monitoring device 18 can include one or more devices/components that operate using mechanical, optical, and/or electronic principles.

Sensor module 70 can include one or more of any types of sensors for obtaining (e.g., sensing) any relevant physical parameter(s) of a component 2 (FIG. 1). In an embodiment of the invention, sensor module 70 includes a main sensor for obtaining component property 52. Sensor module 70 can include one or more additional sensors that can obtain additional component properties 52, can be used in calibration and/or verification of the main sensor, and/or the like. Additionally, sensor module 70 can include one or more emitters (e.g., a light source) that interrogate the component 2 (FIG. 1), the result of which is sensed by one or more sensors.

Processing module 76, when included, can comprise any desired complexity and include one or more of various types of components that perform operation(s), such as computation, amplification, digitization (analog to digital), filtering, modification, and/or the like, on the data obtained by sensor module 70. Additionally, processing module 76 can include data storage component(s) and/or additional component(s) that can adjust the operation of one or more of the other modules in monitoring device 18. The various components in processing module 76 can comprise any combination of partially or entirely mechanical (e.g., micromechanical), electronic, programmable, etc., components.

Communications module 72 can include a transmitter for transmitting a signal. Additionally, communications module 72 can include a receiver for receiving a signal. The transmitter and/or receiver can use any wireless communications solution, including but not limited to, radio frequencies, radiation (coherent or otherwise), acoustics, and/or the like. When both a transmitter and receiver are included in communications module 72, each can use the same or different communications solution(s). For example, communications module 72 can include a receiver that receives radio transmissions on a radiation band and a transmitter that transmits a signal using coherent radiation (laser light). In addition to component property 52, data transmitted to/from communications module 72 can include operational data (e.g., start/stop monitoring), data on a readiness of monitoring device 18 and/or relay device 16, verification of data, status information for one or more modules, troubleshooting/diagnostic/calibration data, maintenance/upkeep data, and/or the like.

Power module 74 can comprise one or more components for generating, storing, and/or distributing power to the various modules in monitoring device 18. To this extent, power module 74 can include one or more power generation components, such as a device that obtains and converts energy from a surrounding environment (e.g., a solar cell, a piezoelectric vibration transducer, a thermoelectric conversion device, a wind conversion device, and/or the like), a micromechanical power generation system (e.g., a micro-steam engine), and/or the like. Power module 74 also can include one or more power storage components for storing energy for later use, such as a microbattery, a miniature supercapacitor, a mechanical storage device (e.g., a spring, compressed material, and/or the like) that can be used in conjunction with inductors, and/or the like. To this extent, power module 74 can include one or more components that both generate and store power, such as a fuel cell. Additionally, power module 74 can include one or more components for distributing an appropriate amount/type of energy to each of the other modules (e.g., communications module 72 may require a higher voltage than sensor module 70).

It is understood that monitoring device 18 and the various modules shown therein are is only an illustrative embodiment. To this extent, in alternative embodiments of monitoring device 18, one or more modules may not be included, the functionality of two or more modules can be combined into a single module, and/or one or more additional modules may be included. For example, monitoring device 18 can be implemented without processing module 76. Additionally, monitoring device 18 can be implemented without a power module 74 when the remaining modules include components that are powered externally, such as using Surface Acoustic Wave (SAW) technology. A SAW device is powered by an external energy pulse, which is absorbed and used to generate another modified signal based on the design of the SAW device.

A. Illustrative MEMS-Based Monitoring Device

Regardless, in an embodiment of the invention, monitoring device 18 comprises a self-powered MEMS or Nano-Electro-Mechanical Systems (NEMS) device, which can be on the order of a millimeter in length and extremely thin. A MEMS-based design can enable monitoring device 18 to be more rugged, smaller in size, self-powered, emit lower noise, etc., than other solutions. In an illustrative MEMS-based design, or other designs, monitoring device 18 can constantly transmit a signal, one or more properties (e.g., frequency, amplitude, and/or the like) of which varies based on component property 52. Relay device 16 can receive the signal and derive component property 52 based on the variation. For example, relay device 16 can determine a difference between a reference property and the property of the signal that was received, and determine component property 52 based on the difference.

Figure 4:
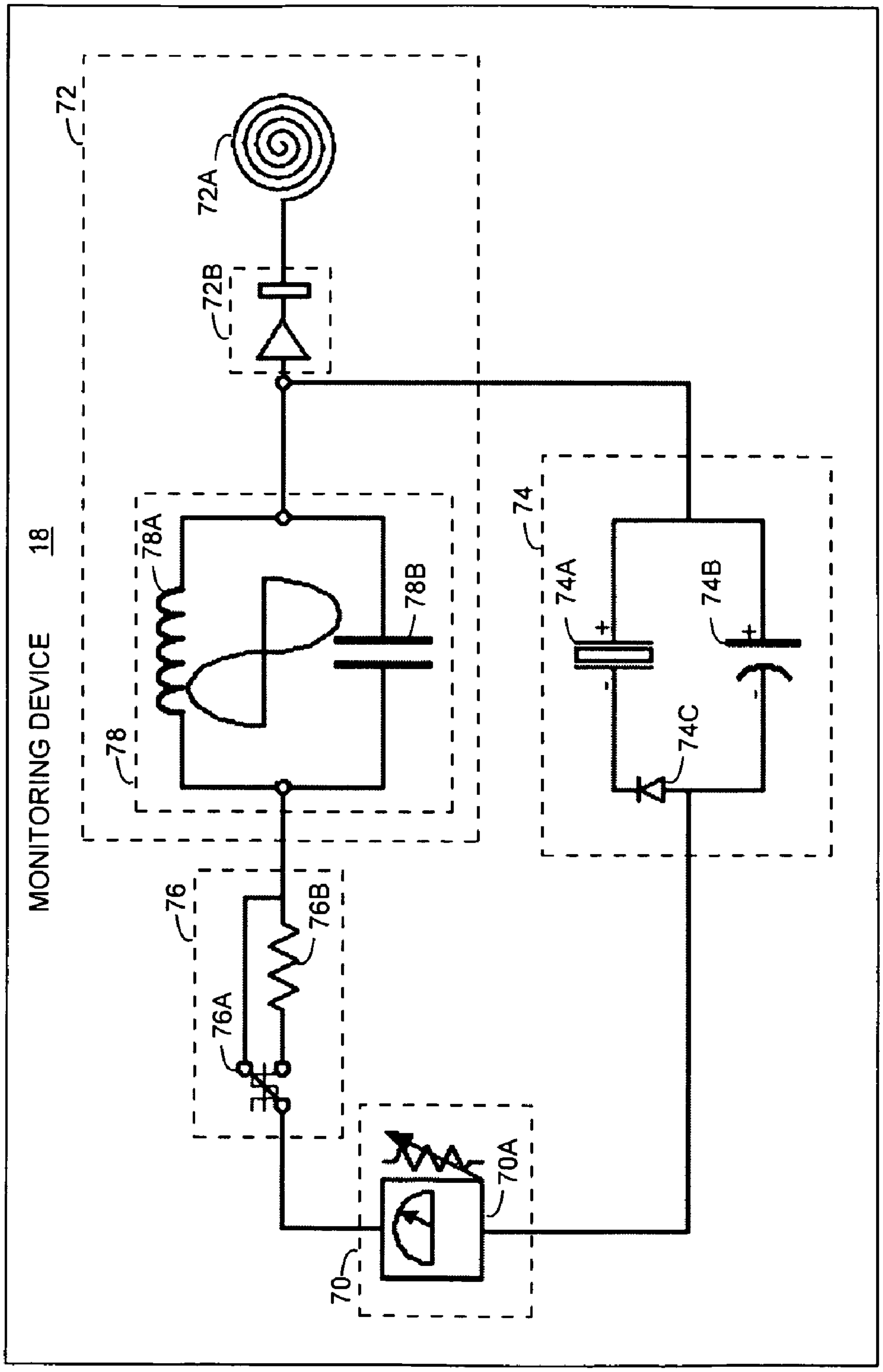
FIG. 4 shows a circuit diagram of an illustrative monitoring device according to an embodiment of the invention.

FIG. 4 shows a circuit diagram of an illustrative MEMS-based monitoring device 18 according to an embodiment of the invention, which continuously transmits a signal on varying frequencies based on a component property 52 (FIG. 3). In particular, sensor module 70 includes a variable resistor 70A, the resistance of which varies based on the component property 52, such as thermistors, piezo-resistors, inductive resistors, and/or the like. Variable resistor 70A is coupled to a communications module 72 that includes a MEMS-based transmitter, which includes a harmonic oscillator 78 and an antenna 72A. Harmonic oscillator 78 is shown including an inductor 78A and a capacitor 78B that are connected in parallel with one another. Optionally, depending on the application, communications module 72 can include additional circuitry 72B, such as an amplifier, an impedance matching component, and/or the like.

In operation, monitoring device 18 transmits a signal on a characteristic frequency that is determined by the characteristics of inductor 78A and capacitor 78B in harmonic oscillator 78 and an overall resistance of the entire circuit. As a result, as a resistance of variable resistor 70A varies, the transmission frequency of monitoring device 18 also will vary. By knowing a base frequency and determining the variation from the base frequency in the signal, a change in a component property 52 (FIG. 3) can be determined.

When multiple monitoring devices 18 communicate with a single relay device 16 (FIG. 1), relay device 16 may need to distinguish between the monitoring devices 18. In an embodiment of the invention, each monitoring device 18 can be distinguished based on its transmitted signal. For example, each monitoring device 18 can comprise a unique transmission band of frequencies that is at least as wide as a potential variation in the frequencies that will be induced by sensor module 70. In this case, each monitoring device 18 can be distinguished based on the transmission band for the signal. Additionally, monitoring device 18 can include a processing module 76 that adjusts one or more properties of the transmitted signal, which can be used to identify the source monitoring device 18. For example, processing module 76 is shown including a switch 76A and a resistor 76B. Switch 76A can alternate between two states, one of which adds the resistance of resistor 76B to the circuit, thereby altering the transmitted signal due to the added resistance. Monitoring device 18 can use a unique period for switching between the states and/or a unique resistance for resistor 76B, which can be used to identify the particular monitoring device 18.

Power module 74 is shown including a power generation device 74A and a power storage device 74B. Power generation device 74A can comprise any type of power generating device, such as a solar cell, a piezoelectric vibration transduction device, a pressure/temperature differential power generation device, and/or the like. Power storage device 74B can comprise any type of power storing/distributing device, such as a microbattery, a miniature supercapacitor, a mechanical device/inductor system, and/or the like. Power module 74 also includes a diode 74C that prevents power storage device 74B from draining power through power generation device 74A.

B. Illustrative MEMS-Based Power Generation Design

Inclusion of power generation device 74A removes the requirement that power be supplied to monitoring device 18 via an external source, battery having a finite lifetime, using SAW, and/or the like. In this manner, monitoring device 18 can continually operate independent of any other devices/power sources. Numerous mechanical and electrical MEMS approaches exist for generating (harvesting) power from ambient conditions, such as solar energy, piezoelectric vibration, temperature or pressure differentials, and the like, for monitoring device 18.

Figure 5A:
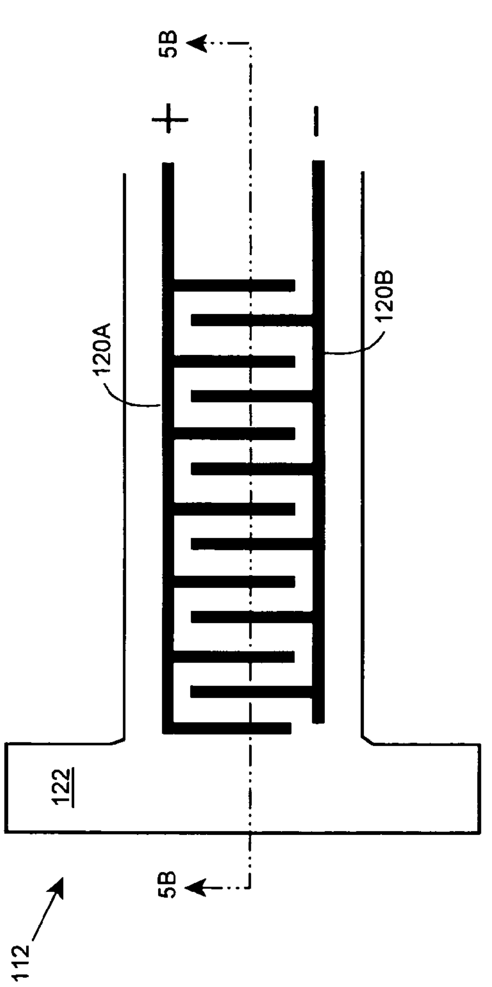
FIGS. 5A-B show an illustrative MEMS design for generating power from piezoelectric vibration according to an embodiment of the invention.
Figure 5B:
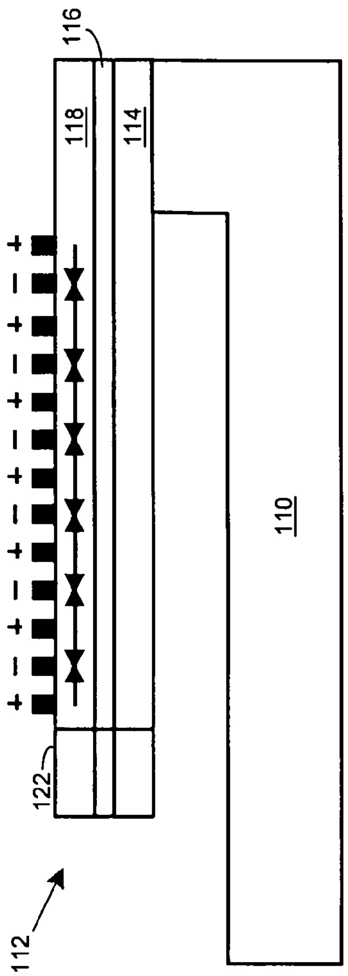

Piezoelectric materials, such as Lead Zirconium Titanate (often referred to as "PZT"), quartz (Silicon Dioxide), and/or the like, generate electrical potentials when stressed. Consequently, a device design that regularly stresses a piezoelectric material can generate power. FIGS. 5A-B show a top and side view respectively, of an illustrative MEMS design for generating power from piezoelectric vibration according to an embodiment of the invention. The design includes a substrate 110 that supports on one end a cantilever 112. The other end of cantilever 112 is unsupported, thereby allowing cantilever 112 to flex up and down when subjected to vibration. The flexing motion of cantilever 112 generates electrical power.

Cantilever 112 includes a support layer 114, an isolation layer 116, and a piezoelectric layer 118. Support layer 114 can comprise any thickness and type of material, such as silicon dioxide, that provides the desired flexing characteristics for cantilever 112. Isolation layer 116 can comprise any material, such as zirconium oxide, which insulates piezoelectric layer 118 from the remainder of the device, thereby preventing diffusion of an electric charge through the device, which would reduce an amount of electricity that can be used. Piezoelectric layer 118 can comprise any type of piezoelectric material, such as PZT, quartz, and/or the like, which generates an electrical potential when it is flexed, vibrated, or otherwise disturbed.

Piezoelectric layer 118 includes a pair of inter-digitated electrodes 120A-B that are formed in a pattern of alternating fingers. In operation, the fingers provide positive and negative potential, thereby drawing off the generated electricity for use by the rest of the MEMS monitoring device 18 (FIG. 4). To optimize the electricity generation, cantilever 112 should vibrate at its resonant or natural frequency. This frequency is dependent on several factors including the cantilever material, the length and width of cantilever 112, the mass of cantilever 112, etc. In an embodiment of the invention, the environment in which the cantilever 112 will operate can be evaluated to determine the frequencies that are most predominant. Subsequently, one or more aspects of cantilever 112 can be adjusted based on the determined frequencies. For example, cantilever can include an end portion 122 that acts as a driver weight for cantilever 112. By changing the width and/or length of end portion 122, the mass and/or length of cantilever 112, and therefore its resonant frequency, can be adjusted.

C. Illustrative MEMS-Based Strain Sensing Designs

A limitation in implementing a MEMS or NEMS monitoring device 18 (FIG. 4) is an amount of available power that can be harvested at the microscale. For example, current sensors for obtaining commonly desired component properties 52 (FIG. 3), such as strain, pressure, temperature, and the like, have power demands (e.g., milliwatt-level) that far exceed that available from a microscale device (e.g., microwatt-level). Additionally, many applications may require two or more sensors to obtain the component property 52. For example, strain may require measurement along two axes since it often is not unidirectional along a known axis.

Figure 6A:
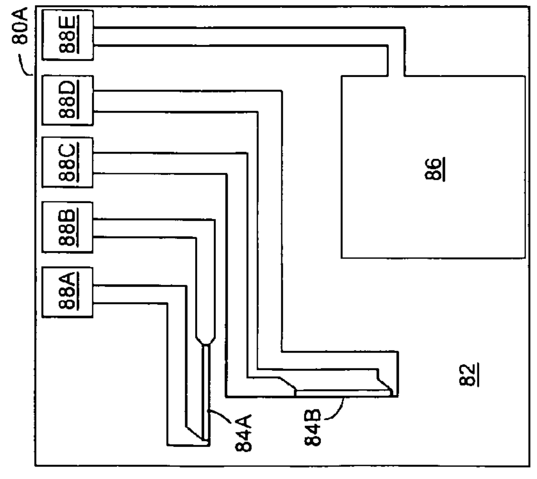
FIGS. 6A-D show illustrative MEMS designs for a strain sensing device according to an embodiment of the invention.
Figure 6B:
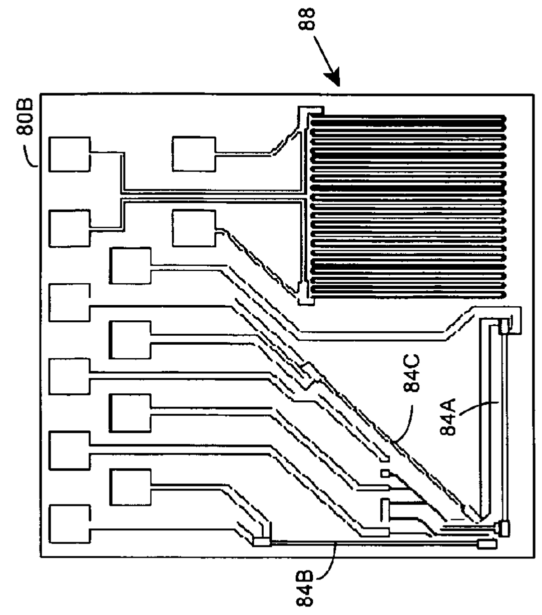

The ultra-low power requirements of a millimeter-scale or smaller monitoring device 18 (FIG. 4) can be met using a unique MEMS design. For example, FIGS. 6A-D show illustrative MEMS designs for a strain sensing device 80A-D according to an embodiment of the invention. Referring to FIG. 6A, strain sensing device 80A includes a base substrate 82 on which a pair of sensor components 84A-B are disposed. Additionally, strain sensing device 80A includes a contact pad 86 for a thermistor, which can be used in calibration, and connection pads and wires 88A-E that provide electrical connection points to each end of sensor components 84A-B and contact pad 86, respectively. Sensor components 84A-B comprise a piezoelectric material, such as PZT, quartz, and/or the like, whose resistance varies under stress. Base substrate 82 can comprise silicon or the like, while pad 86 and pads and wires 88A-E can comprise a metal, such as gold, silver, and/or the like. When implemented as part of a sensor module 70 (FIG. 3) of a monitoring device 18 (FIG. 3), the varying resistance can be used to obtain a stress measurement for a component 2 (FIG. 1).

Figure 6C:
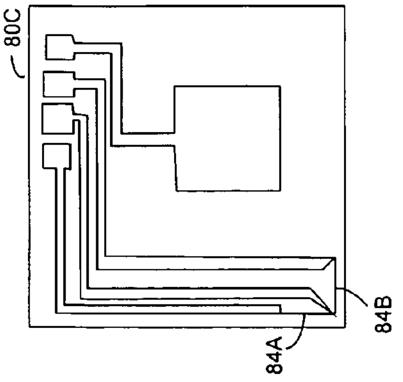
Figure 6D:
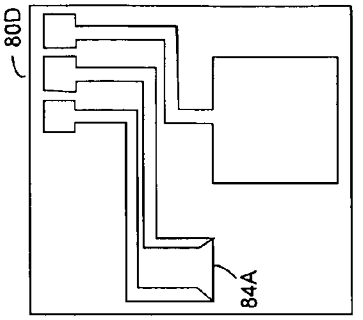

It is understood that numerous alternative configurations can be used for strain sensing device 80A. For example, in FIG. 8B, an alternative configuration for a strain sensing device 80B is shown in which a third sensor component 84C is included in addition to sensor components 84A-B. Sensor component 84C is disposed at an approximately forty-five degree angle with respect to sensor components 84A-B and enables a cross-checking of accuracy between sensor components 84A-B. Additionally, strain sensing device 80B includes a built-in platinum temperature sensor 88. In an embodiment of the invention, strain sensing device 80B can be manufactured as a square having side dimensions of approximately 1.5 millimeters. In FIG. 6C, an alternative configuration for a strain sensing device 80C is shown in which strain may vary widely in an extremely small location, such as the edge of a hole used for fastening. In this case, the sensor components 84A-B are placed closer to one another and toward an edge of strain sensing device 80C. Additionally, in FIG. 6D, an alternative configuration for a strain sensing device 80D is shown in which strain is measured along a single dimension using a single sensor component 84A.

Each strain sensing device 80A-C can be manufactured to a size that is less than approximately three millimeters square, and can be even smaller using a number of manufacturing approaches. During manufacturing, a number of parameters of sensing device 80A-C can be precisely controlled, such as a resistance of the sensing device 80A-C. In an embodiment of the invention, the resistance of sensing device 80A-C ranges from approximately 100,000 Ohms to over ten million Ohms, which can result in a power consumption of fractions of a microwatt for a 1-3 Volt power source. To this extent, a desired resistance of each sensing device 80A-C can be obtained by doping a primary material for the sensing device 80A-C. For example, each sensing device 80A-C can comprise boron-doped silicon, in which the amount of boron implanted into the silicon will change the resistance of the silicon, and therefore the resistance of the corresponding sensing device 80A-C. Various other sensing devices having ultra-low power demand can be similarly designed for numerous applications, such as sensing chemical concentration, pressure, heat, humidity, and/or the like.

Figure 7D:
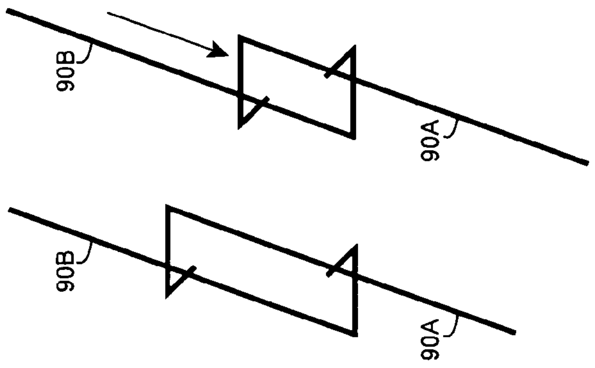
FIGS. 7A-D show an alternative electromechanical MEMS design for measuring strain according to an embodiment of the invention.
Figure 7A:
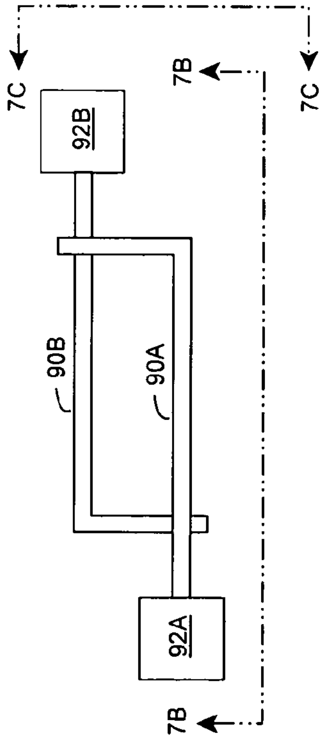
Figure 7B:
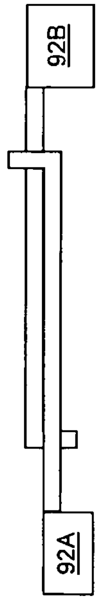
Figure 7C:
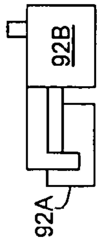

MEMS technology offers numerous mechanical and electromechanical approaches for performing a task (e.g., sensing stress). To this extent, FIGS. 7A-D show an alternative electromechanical MEMS design for measuring strain according to an embodiment of the invention. In this case, a pair of interlocking shafts 90A-B are used such that shaft 90A sits on top of and interlocks with shaft 90B. However, shafts 90A-B are not connected. As shown in FIG. 7D, when shafts 90A-B are subjected to strain (indicated by arrow), they will slide along each other, causing an electrical resistance between connection points 92A-B (FIG. 6A) to vary. The change in the electrical resistance can be calculated and used to measure the corresponding strain.

Figure 8B:
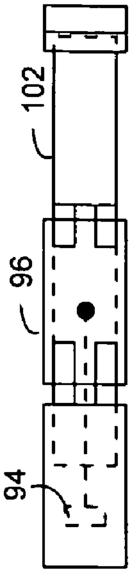
FIGS. 8A-C show an alternative opto-mechanical MEMS design for measuring strain according to an embodiment of the invention.
Figure 8C:
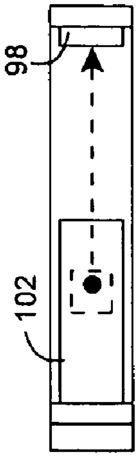
Figure 8A:
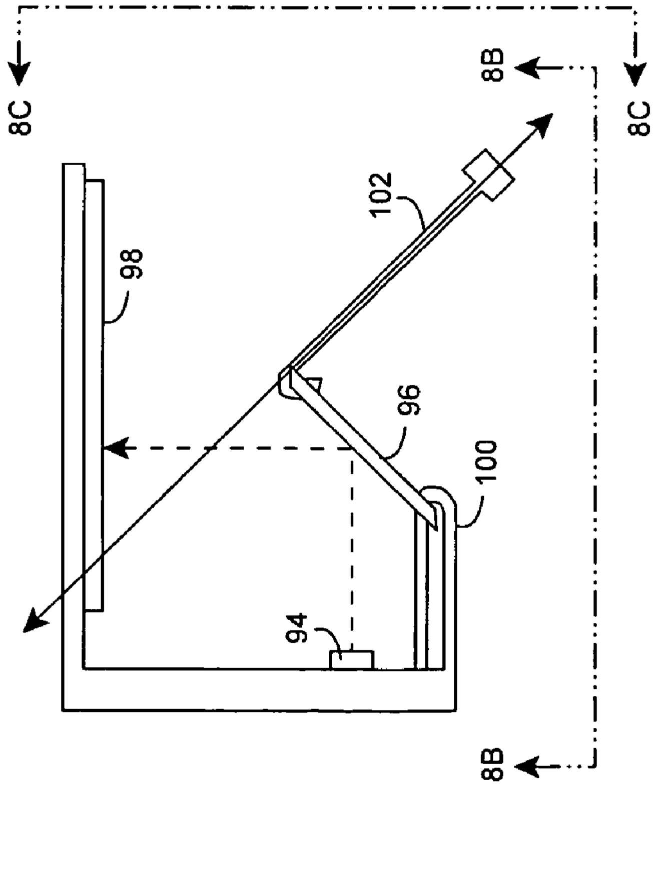

Additionally, FIGS. 8A-C show an alternative opto-mechanical MEMS design for measuring strain according to an embodiment of the invention. In this case, a radiation source 94 emits radiation (indicated by a dashed line) that is reflected off of a mirror 96 and onto a linear sensor 98. Mirror 96 is connected on one end to an assembly that holds the radiation source 94 and linear sensor 98 by a set of hinges 100. The other end of mirror 96 is connected to a set of hinges that are part of a hinged rod 102, which is aligned in an expected direction of strain (indicated by solid line). When the assembly is placed under strain, rod 102 and its hinges will move with respect to the set of hinges 100 causing an angular alignment of mirror 96 to change, thereby changing the position of the radiation sensed by linear sensor 98. The change in the angular alignment can be calculated and used to measure the corresponding strain.

D. MEMS Manufacturing

Figure 9:
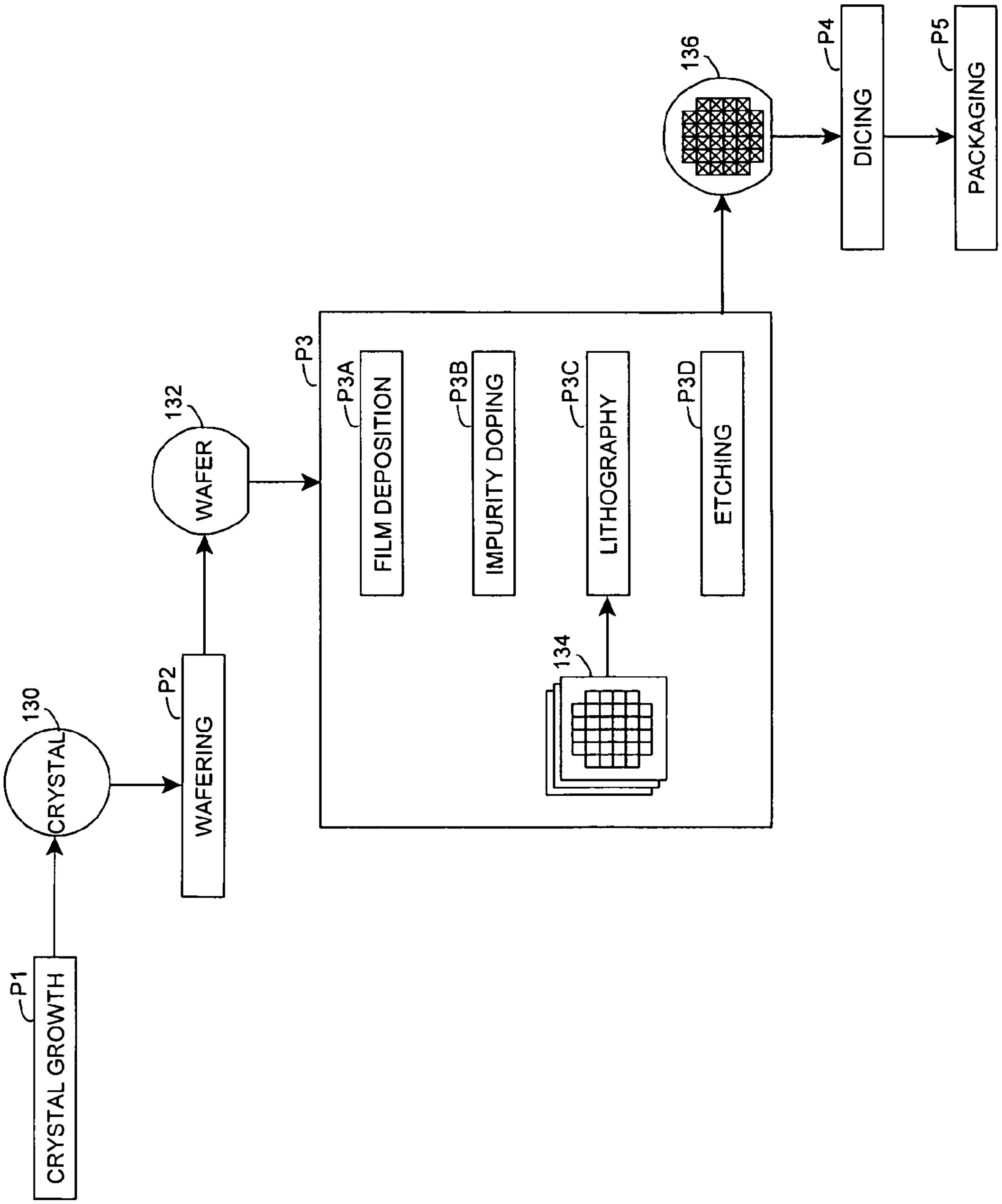
FIG. 9 shows an illustrative manufacturing process for manufacturing MEMS-based devices according to an embodiment of the invention.

Manufacturing of MEMS-based devices can be implemented using a process similar to that used for manufacturing CMOS-based devices. For example, FIG. 9 shows an illustrative manufacturing process for manufacturing MEMS-based devices according to an embodiment of the invention. In process P1, a crystal 130 of a base material, such as Silicon, is grown to a particular set of purity specifications. In process P2, crystal 130 is cut into one or more wafers 132. In process P3, each wafer 132 can be subjected to various sub-processes repeated in any number of times and/or in various orders to generate a set of MEMS-based devices.

For example, in sub-process P3A, a layer (film) of a particular substance, such as a photoreactive material, a metal (e.g., gold, aluminum, etc.), and/or the like, is deposited on wafer 132 and/or other layer(s) previously deposited on wafer 132. The layer can be deposited for numerous purposes, such as to create electrical contacts (e.g., using a metal film), to selectively dissolve and/or protect portions of wafer 132 and/or lower layers (e.g., using a photoreactive material), and/or the like. In sub-process P3B, impurity doping can introduce a substance into the material of wafer 132 and/or a layer of material on wafer 132. For example, boron can be introduced into a silicon substrate to make the silicon more electrically conductive.

Additionally, in sub-process P3C, lithography can be used to remove some or all of a previously deposited layer. In particular, lithography comprises a photographic-style process that uses photoreactive (or other radiation reactive) layers (e.g., as deposited in sub-process P3A) combined with a set of masks 134 to dissolve areas of one or more layers exposed to the light to produce a desired pattern of material on wafer 132. Similarly, in sub-process P3D, chemical and/or energy-based etching can be used to remove some or all of an exposed surface of a layer and/or wafer 132.

By performing a proper combination of sub-processes P3A-D, a designer can create extremely complex designs from a wafer 132 in a very small space. For example, a proper sequence of film depositions P3A, lithography P3C, and etching P3D, using the correct reagents can create a complex set of gears and remove substrate from between and under critical components, allowing them to fall into place as free-standing objects. To this extent, cantilever 112 (FIGS. 5A-B) can be created by using a mask 134 to etch away cantilever 112 from a substance that is resistant to a solvent that is capable of dissolving the layer beneath cantilever 112.

Figure 10:
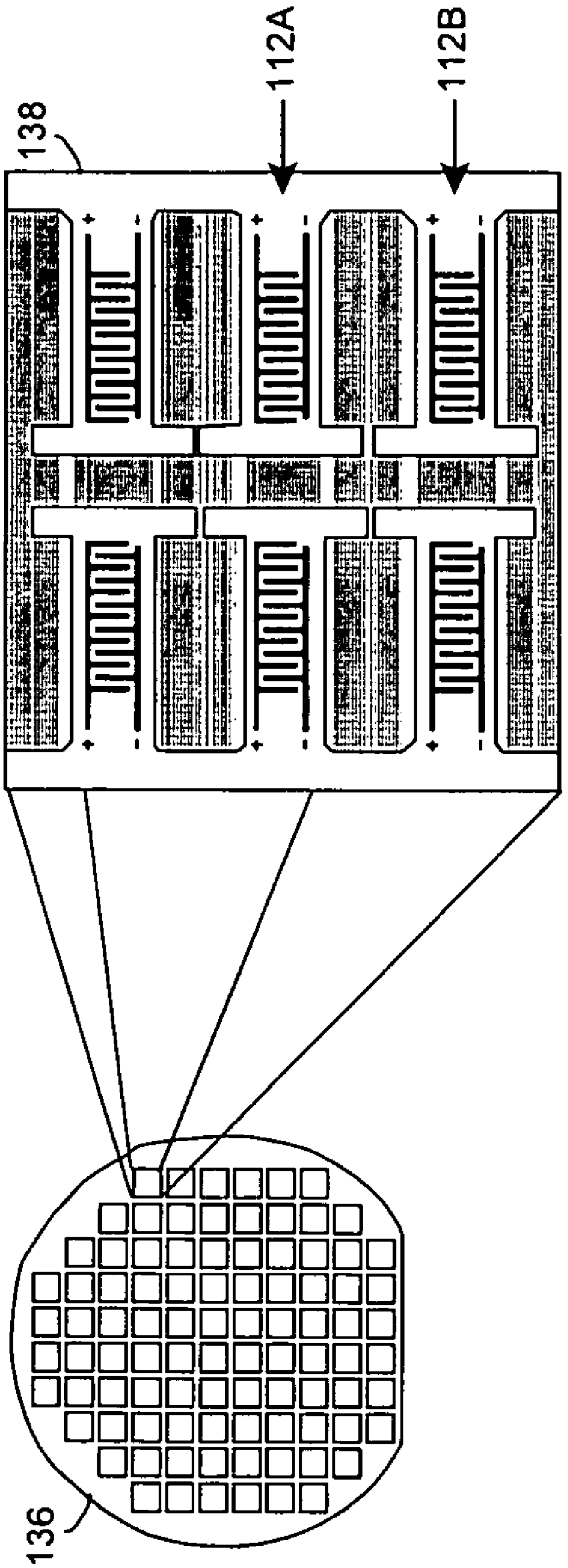
FIG. 10 shows an illustrative wafer, on which numerous MEMS-based devices have been manufactured according to an embodiment of the invention.

Process P3 can produce a large number of similar and/or identical MEMS devices on a single wafer 132. To this extent, process P3 can result in a wafer 136 having numerous MEMS devices laid out in a grid pattern. For example, FIG. 10 shows an illustrative wafer 136, on which numerous MEMS-based devices, such as devices 112A-B, have been manufactured according to an embodiment of the invention. In this example, wafer 136 includes multiple rectangular areas 138 laid out in a grid fashion. Each rectangular area 138 includes six cantilever-style MEMS power generation devices 112A-B.

In any event, returning to FIG. 9, once process P3 is complete, in process P4, dicing can be performed to separate the MEMS devices 112A-B (FIG. 10), and in process P5, the MEMS devices 112A-B can be packaged (e.g., encased). It is understood that a single wafer 136 can include MEMS devices 112A-B that are substantially identical, the same type of MEMS devices 112A-B having differing operating properties (e.g., different resonant frequencies for power generation devices 112A-B), multiple types of MEMS devices, one or more other types of non-MEMS devices (e.g., SAW, CMOS), and/or the like.

E. Alternatives

MEMS devices can be incorporated into any number of devices/applications. Returning to FIG. 4, while monitoring device 18 has been shown and described as comprising an entirely MEMS-based design. It is understood that monitoring device 18 can comprise any appropriate design. To this extent, monitoring device 18 can comprise components having any combination of MEMS, CMOS, and/or SAW technologies. For example, monitoring device 18 can comprise MEMS components, such as in sensing module 70 and/or power module 74, that are connected to one or more CMOS components, such as a microprocessor, transceiver, and/or the like. Use of a CMOS-based microprocessor may provide superior computational capacity, memory storage, and/or speed, which may be desirable in some applications. Similarly, one or more MEMS components, such as sensors for stress, humidity, chemical contamination, and/or the like, may be replaced and/or supplemented with a SAW component. MEMS, CMOS, and/or SAW-based components can be separately manufactured, bonded to a common support substrate, and connected with an appropriate connective material and/or can be manufactured as a single integrated unit (e.g., using the process shown and described in FIG. 9). Additionally, it is understood that a monitoring device can include additional and/or more elaborate functionality than that illustrated by monitoring device 18.

Figure 11B:
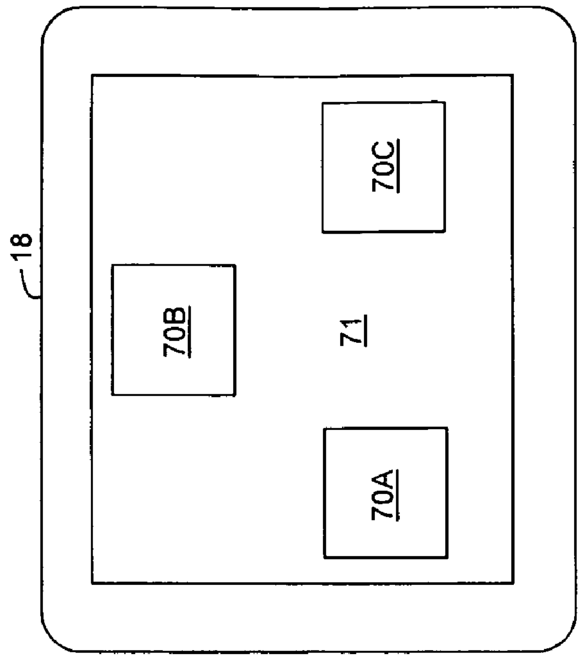
FIGS. 11A-B show side and bottom views, respectively, of an illustrative monitoring device according to an embodiment of the invention.
Figure 11A:
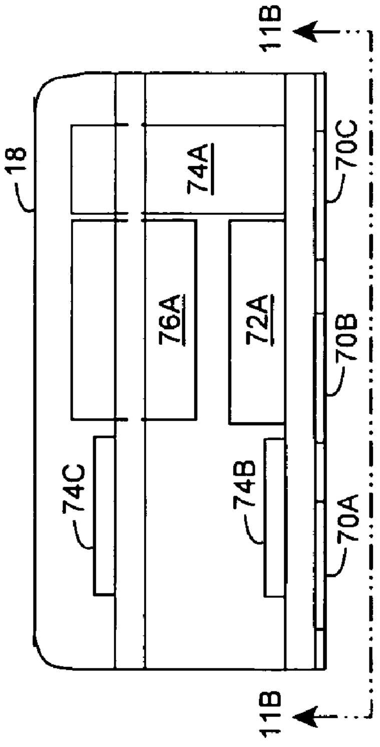

To this extent, FIGS. 11A-B show side and bottom views, respectively, of an illustrative monitoring device 18 according to an embodiment of the invention. Monitoring device 18 can be shaped as a square having sides of approximately thirteen millimeters. Monitoring device 18 includes sensors 70A-C on a bottom surface, which can comprise a temperature sensor 70A, a strain sensor 70B, and a pressure sensor 70C, although any number and/or combination of sensors 70A-C can be used. The bottom surface can include a glue 71 or the like, for attaching monitoring device 18 to a component or other location. Additionally, monitoring device 18 is shown including a radio frequency transceiver, which can comprise a CMOS-based device, a MEMS-based power generating device 74A that generates power from vibration, pressure, temperature differentials, and/or the like, a pair of MEMS-based power storage devices 74B-C, such as a MEMS battery, supercapacitor, and/or the like, and a processing device 76A, which can provide processing and/or data storage capabilities for monitoring device 18. In operation, the various sensors 70A-C can obtain component property data, which can be processed/stored by processing device 76A and/or communicated by transceiver 72A. Power generating device 74A can generate sufficient power to operate all the components of monitoring device 18 without requiring an external power source.

IV. Illustrative Applications

As noted previously, a limiting component of a machine can be monitored according to an aspect of the invention. For example, a rotor shaft in a helicopter drive system may have a limit of allowable torque that is lower than an amount of torque that would be experienced (e.g., according to a model) if an engine system generated all of its available power. In this case, since the actual torque experienced by the rotor shaft presently is difficult or impossible to accurately monitor, the amount of power actually used will be kept lower than the maximum to ensure that the torque remains within safe limits. As a result, performance of the entire helicopter is degraded. To this extent, in a typical system, approximately 70% of the available power is used to keep the aircraft afloat, with the remaining 30% being available for maneuvering the aircraft. However, if the power consumption is limited to 95% of the available power, then only 25% of the available power is available for maneuvering. This results in a loss of approximately 16.7% of the power available for maneuvering the aircraft. An embodiment of the invention addresses this situation by monitoring the rotor shaft and providing precise measurements of the torque being experienced by the helicopter drive system. In this manner, the helicopter may be able to use additional available power, which can increase its maneuverability.

Figure 12:
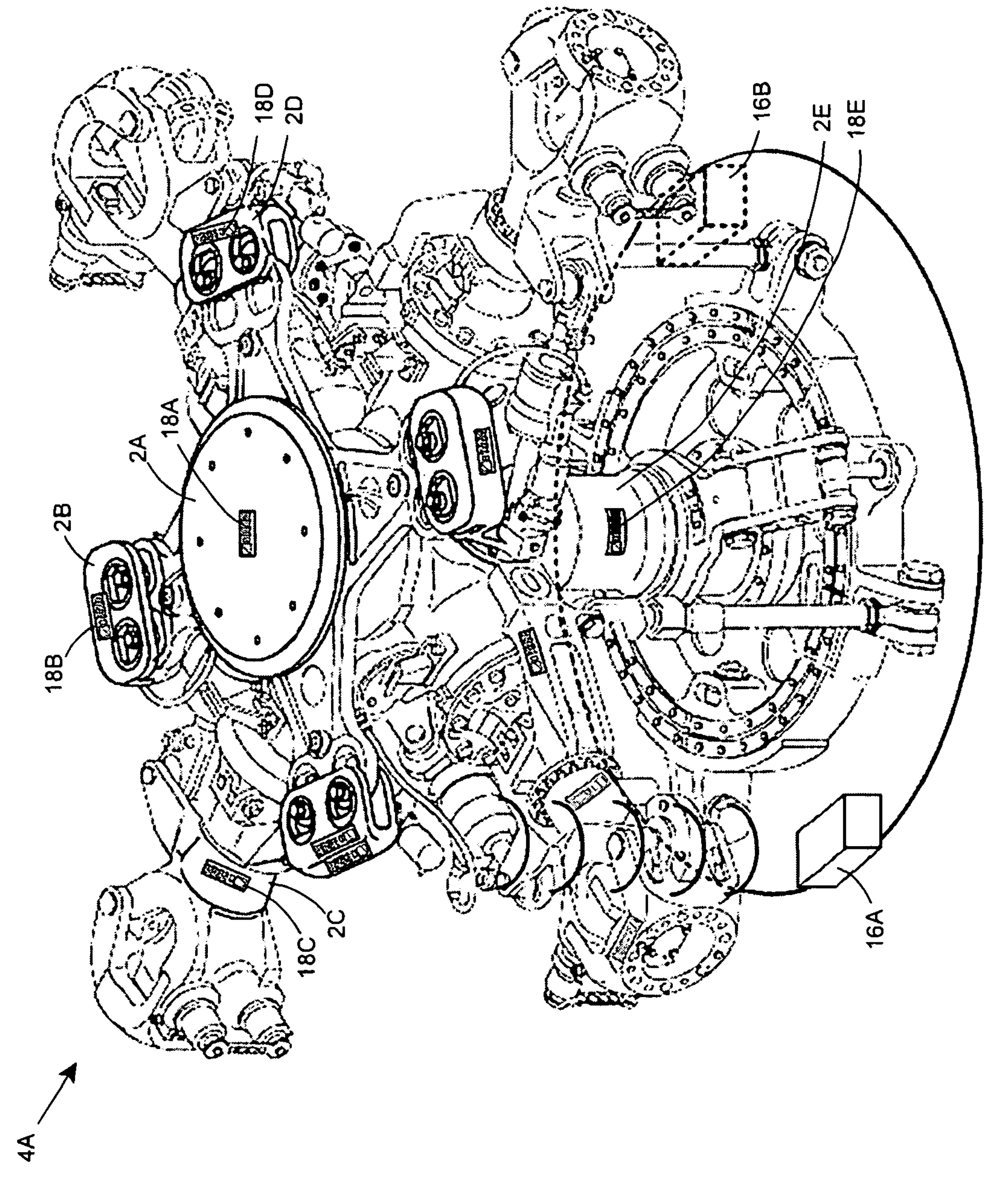
FIG. 12 shows an illustrative helicopter rotor assembly according to an embodiment of the invention.

FIG. 12 shows an illustrative helicopter rotor assembly 4A according to an embodiment of the invention. Helicopter rotor assembly 4A includes a large number of components, such as components 2A-E, which move during operation of the helicopter. As a result, during operation, properties of components 2A-E cannot be monitored using a wired connection. An aspect of the invention provides attaching at least one monitoring device, such as monitoring devices 18A-E, to each of the components 2A-E to be monitored. Monitoring devices 18A-E obtain (e.g., sense) one or more properties of the corresponding component 2A-E and communicate the component properties 52 (FIG. 3) to one or more relay devices 16A-B. Each relay device 16A-B can be attached to helicopter rotor assembly 4A and/or the corresponding helicopter in a location that does not move with respect to the remainder of the helicopter. Relay device(s) 16A-B can process the component properties and provide the results for immediate use in operating helicopter rotor assembly 4A (e.g., to provide feedback to an operator, control data to a system capable of adjusting its operation, and/or the like). Further, relay device(s) 16A-B can communicate the component data to a health monitoring program 30 (FIG. 1) for further processing and/or storage.

In an embodiment of the invention, each monitoring device 18A-E monitors the strain/stress to which the corresponding component 2A-E is subjected. Relay devices 16A-B can store the strain/stress and provide the data to another system, such as health monitoring program 30 (FIG. 1), which can apply the data to a model and determine a useful lifetime usage for each component 2A-E. In this manner, helicopter rotor assembly 4A can be scheduled for just in time maintenance, thereby reducing an amount of time/materials currently wasted on maintenance scheduled based on statistical usage computations. Further, the strain/stress data can be used in real time to enable an operator to determine whether helicopter rotor assembly 4A is at its operating limits at any point in time. Regardless, it is understood that helicopter rotor assembly 4A is only illustrative of numerous complex mechanical machines that include components capable of being monitored using aspects of the invention.

Returning to FIG. 1, in another application, each monitoring device 18 can be disposed within a corresponding component 2. To this extent, each monitoring device 18 can be embedded during manufacturing of component 2. For example, during manufacturing of a sheet of composite material for a hull, monitoring device(s) 18 can be embedded into a resin that bonds the hull material. Alternatively, each monitoring device 18 can be placed within component 2 after its manufacture. For example, monitoring device(s) 18 can be embedded into small holes drilled into a roadbed, bridge, building, and/or the like, to monitor one or more component properties 52 (FIG. 3), such as temperature, pressure, etc.

Additionally, a monitoring device 18 can include one or more energy emitters (e.g., light, magnetic wave, acoustic signals, and/or the like), which enables monitoring device 18 to comprise an active sensor. For example, numerous MEMS-based monitoring devices 18 could produce relatively weak but well-defined probe signals for which the return data can be collectively analyzed to produce useful results. Further, a monitoring device 18 can include an ability to move. To this extent, a MEMS-based monitoring device 18 can include microscopic leg assemblies, wheels, wings, and/or the like, which enable monitoring device 18 to move on its own. For example, such a monitoring device 18 can be used to self-deploy into a component 2 that cannot be readily reached by a human or a macro-scale tool, to adjust a distribution of monitoring devices 18 after installation, and/or the like.

V. Alternatives

While shown and described herein as monitoring a component 2 of a machine 4, it is understood that numerous alternative embodiments are possible. To this extent, monitoring devices 18 can be used to monitor any type of object and/or an area/location. For example, monitoring device(s) 18 can be affixed to a structure and monitor various weather conditions (e.g., humidity, temperature, light, and/or the like). Additionally, many monitoring devices 18 could be deployed and combine sensor data to produce image-like information (e.g., based on acoustic, magnetic, radio, light, and/or the like sensing data) for an area. Further, such monitoring devices 18 can be used in medical applications to provide internal functioning data by being introduced into a patient. To this extent, monitoring devices 18 can be distributed in a location, device, or area in an ad-hoc fashion.

In another alternative embodiment of the invention, a single device can include the functionality described herein with respect to monitoring devices 18 and relay devices 16. For example, the device can be used to monitor components 2 on which centimeter-scale monitoring devices can be placed. In this case, the combined devices can communicate with one another as well as computing device 14. To this extent, the combined devices can form a mesh network, in which each device acts as a relay for other device(s), helping to assure that all the devices can communicate with computing device 14 as long as one of the devices can communicate with computing device 14.

Figure 13A:
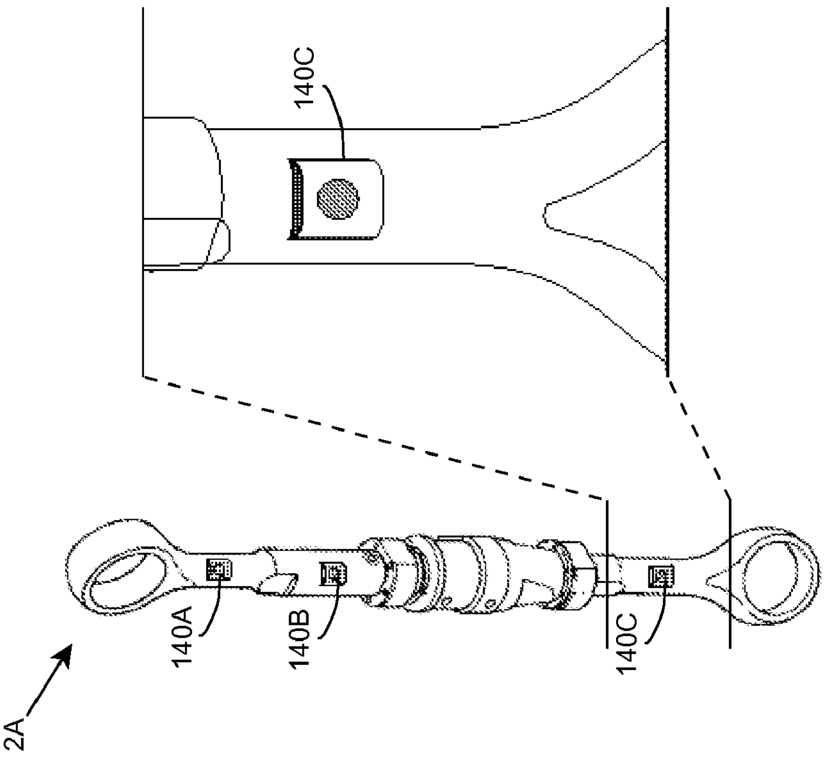
FIGS. 13A-B show illustrative combined devices for monitoring components according to alternative embodiments of the invention.
Figure 13B:
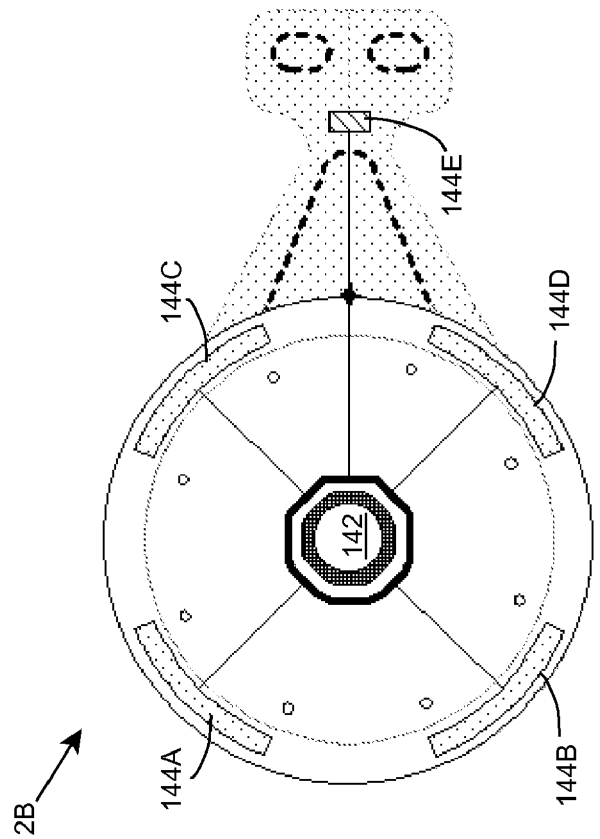

FIGS. 13A-B show illustrative combined devices 140A-C, 142 for monitoring components 2A-B according to alternative embodiments of the invention. In FIG. 13A, component 2A includes multiple combined devices 140A-C (such as monitoring device 18 shown in FIGS. 11A-B), each of which is affixed to a portion of component 2A in a manner (e.g., glue, solder, etc.) that provides proper contact between a set of sensors in each combined device 140A-C and component 2A. In FIG. 13B, component 2B comprises two parts that do not move relative to one another during normal operation. A single combined device 142 is affixed to component 2B and includes a sensor module that interfaces with multiple sensors 144A-E located remote from combined device 142. Each sensor 144A-E can be physically connected to combined device 142 or communicate with combined device 142 wirelessly as described herein. When physically connected, a joint between the two parts can include conductive paint, matched electrical contacts, and/or the like, to form the connection.

It is understood that numerous types of monitoring devices 18 can be incorporated in a single application. For example, an aircraft could include: monitoring devices 18 applied to monitor a rotor as shown in FIG. 12, monitoring devices 18 manufactured into a hull, combined devices 140A-C (FIG. 13A) on larger components 2 (e.g., landing gear), a set of mobile monitoring devices 18 in a toolkit for use in repair diagnostics, and/or the like.

While shown and described herein as a method and system for monitoring a component and/or an area, it is understood that aspects of the invention further provide various alternative embodiments. For example, in one embodiment, the invention provides a computer program stored on a computer-readable medium, which when executed, enables a computer system to component data received in such a system. To this extent, the computer-readable medium includes program code, such as health monitoring program 30 (FIG. 1), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for monitoring a component and/or area. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices, such as relay device 16 and/or monitoring device(s) 18, to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider could offer to monitor a component and/or area as described herein. In this case, the service provider can manage (e.g., create, maintain, support, etc.) a computer system, such as computer system 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as some or all of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A monitoring system comprising:

a monitoring device including:

a Micro-ElectroMechanical Systems (MEMS)-based sensing device configured to sense a property of at least one of: an area or an object, distinct from the sensing device, to which the monitoring device is affixed;

a transmitter, distinct from the sensing device, configured to transmit a signal based on the property and an identity of the monitoring device, wherein the MEMS-based sensing device varies at least one of: a frequency, an amplitude, or a phase of the signal with the property, and wherein the signal is transmitted either continuously or periodically according to a set time period;

a processing module configured to periodically switch between two states to adjust at least one of: the frequency, the amplitude, or the phase of the signal to identify the monitoring device; and a power module configured to provide power to the sensing device and the transmitter.

2. The system of claim 1, wherein an impedance of the sensing device changes with the property.

3. The system of claim 1, wherein the property is at least one of: a stress or a strain experienced by an object.

4. The system of claim 1, wherein the sensing device and transmitter are serially connected to the power module.

5. The system of claim 1, further comprising:

a receiver configured to receive the signal from the monitoring device;

a processor configured to process the signal to determine the sensed property; and a health monitoring system configured to evaluate the sensed property.

6. The system of claim 5, wherein the processor is a Complementary Metal-Oxide Semiconductor (CMOS)-based microprocessor, and wherein the transmitter and the receiver are implemented using a CMOS-based radio frequency transceiver.

7. The system of claim 6, the power module including:

a set of MEMS-based power storage devices; and a MEMS-based power generating device configured to generate power from an ambient condition of the monitoring device.

8. The system of claim 1, wherein the power module includes a power generation device configured to generate power from an ambient condition of the monitoring device.

9. The system of claim 1, wherein the monitoring device is configured to monitor a property of a person.

10. The system of claim 1, wherein the transmitter is an acoustic transmitter configured to transmit the signal using an acoustic communication solution.

* * * * *